United States Patent
Yamamoto et al.

(10) Patent No.: US 12,521,652 B2
(45) Date of Patent: Jan. 13, 2026

(54) FILTER CLOTH CLEANING METHOD OF FILTER PRESS

(71) Applicant: ISHIGAKI COMPANY LIMITED, Tokyo (JP)

(72) Inventors: Daisuke Yamamoto, Kagawa (JP); Koji Hara, Kagawa (JP); Shoji Motoya, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 1091 days.

(21) Appl. No.: 17/284,835

(22) PCT Filed: Oct. 21, 2019

(86) PCT No.: PCT/JP2019/041371
§ 371 (c)(1),
(2) Date: Apr. 13, 2021

(87) PCT Pub. No.: WO2020/095670
PCT Pub. Date: May 14, 2020

(65) Prior Publication Data
US 2021/0387114 A1    Dec. 16, 2021

(30) Foreign Application Priority Data

Nov. 5, 2018    (JP) .................................. 2018-207875

(51) Int. Cl.
*B01D 25/38* (2006.01)
*B01D 25/127* (2006.01)
(Continued)

(52) U.S. Cl.
CPC ......... *B01D 25/386* (2013.01); *B01D 25/127* (2013.01); *B01D 25/346* (2013.01); *B08B 3/02* (2013.01)

(58) Field of Classification Search
CPC .... B01D 25/12; B01D 25/127; B01D 25/346; B01D 25/386; B08B 3/02
See application file for complete search history.

(56) References Cited

U.S. PATENT DOCUMENTS 3,169,706 A  *  2/1965  Ross ..................... B05B 3/14
                                         239/752
3,344,922 A  *  10/1967  Kracklauer ............ B01D 29/66
                                         210/236

(Continued)

FOREIGN PATENT DOCUMENTS

CN    207237400 U    4/2018
EP    0247445 B1     1/1991
(Continued)

OTHER PUBLICATIONS

International Search Report in WIPO Patent Application No. PCT/JP2019/041371, dated Jan. 21, 2020.

*Primary Examiner* — Patrick Orme
(74) *Attorney, Agent, or Firm* — Greenblum & Bernstein, P.L.C.

(57) ABSTRACT

A method of cleaning a filter cloth of a filter press including a first cleaning nozzle and a second cleaning nozzle which jet cleaning liquid from positions upper right and left of the filter cloth toward respective diagonal corners of the filter cloth, the method including: jetting the cleaning liquid from only the first cleaning nozzle; and jetting the cleaning liquid from only the second cleaning nozzle.

8 Claims, 7 Drawing Sheets

(51) Int. Cl.
   *B01D 25/34*   (2006.01)
   *B08B 3/02*    (2006.01)

(56)              References Cited

U.S. PATENT DOCUMENTS

| | | | | |
|---|---|---|---|---|
| 3,471,026 A * | 10/1969 | Riker | B01D 33/463 | 210/334 |
| 3,486,624 A * | 12/1969 | Sykes | B01D 25/164 | 134/144 |
| 4,064,045 A * | 12/1977 | Schmidt, Jr. | B01D 29/822 | 210/770 |
| 4,076,033 A * | 2/1978 | Busse | B01D 25/172 | 239/536 |
| 4,107,042 A * | 8/1978 | Heinrich | B01D 25/386 | 210/231 |
| 4,169,056 A * | 9/1979 | Sakuma | B01D 25/285 | 210/230 |
| 4,201,672 A * | 5/1980 | Kenyon | B01D 25/386 | 210/225 |
| 4,465,714 A * | 8/1984 | Petro, IV | A23N 15/06 | 118/313 |
| RE31,792 E * | 1/1985 | Colomer | B01D 46/00 | 210/143 |
| 4,597,862 A * | 7/1986 | Davis | B01D 25/383 | 210/231 |
| 4,639,315 A * | 1/1987 | Fuchs | B01D 33/21 | 210/426 |
| 4,646,769 A * | 3/1987 | O'Brien | F23J 3/00 | 134/199 |
| 4,659,465 A * | 4/1987 | Makinoda | B01D 25/386 | 210/236 |
| 4,676,901 A * | 6/1987 | Ragnegard | B01D 33/21 | 210/486 |
| 4,695,381 A * | 9/1987 | Ragnegard | B01D 33/808 | 210/403 |
| 4,806,239 A * | 2/1989 | Davis | B01D 25/172 | 210/230 |
| 4,842,733 A * | 6/1989 | Kurita | B01D 25/34 | 210/231 |
| 4,882,049 A * | 11/1989 | Davis | B01D 25/172 | 210/231 |
| 4,883,592 A * | 11/1989 | Kurita | B01D 25/176 | 210/231 |
| 4,900,454 A * | 2/1990 | Hedlund | B01D 25/285 | 210/230 |
| 4,975,189 A * | 12/1990 | Liszka | B01D 33/463 | 210/411 |
| 5,110,466 A * | 5/1992 | Tanii | B01D 25/215 | 210/225 |
| 5,124,029 A * | 6/1992 | Fjallstrom | B01D 33/15 | 209/250 |
| 5,133,884 A * | 7/1992 | Carlsson | B01D 25/346 | 210/791 |
| 5,149,448 A * | 9/1992 | Mattelmaki | B01D 33/463 | 210/791 |
| 5,167,801 A * | 12/1992 | Kawasaki | B01D 25/386 | 210/225 |
| 5,228,467 A * | 7/1993 | Gilliam, Jr. | B01D 25/386 | 134/100.1 |
| 5,296,098 A * | 3/1994 | Fjallstrom | D21D 1/40 | 210/402 |
| 5,328,617 A * | 7/1994 | De Haan | B01D 25/164 | 210/791 |
| 5,368,751 A * | 11/1994 | Glendinning | B01D 25/127 | 210/791 |
| 5,395,523 A * | 3/1995 | Oka | B01D 25/172 | 210/230 |
| 5,449,468 A * | 9/1995 | Trummel | B01D 25/34 | 210/388 |
| 5,470,472 A * | 11/1995 | Baird | B01D 33/60 | 210/402 |
| 5,567,327 A * | 10/1996 | De Haan | B01D 25/164 | 210/791 |
| 5,660,196 A * | 8/1997 | Bein | F16L 37/248 | 134/131 |
| 5,759,397 A * | 6/1998 | Larsson | B01D 33/21 | 210/402 |
| 5,779,887 A * | 7/1998 | Rector | B01D 29/01 | 210/159 |
| 5,843,310 A * | 12/1998 | Tsuchida | B01D 25/386 | 210/230 |
| 5,846,415 A * | 12/1998 | Tsuchida | B01D 25/127 | 210/230 |
| 5,855,778 A * | 1/1999 | Hutchison | B01D 25/172 | 210/231 |
| 5,897,788 A * | 4/1999 | Ketolainen | B01D 33/463 | 210/791 |
| 5,900,158 A * | 5/1999 | Ruokolainen | B01D 33/466 | 210/780 |
| 5,951,861 A * | 9/1999 | Strid | B01D 33/466 | 210/402 |
| 5,951,878 A * | 9/1999 | Astrom | B01D 33/21 | 210/197 |
| 5,968,372 A * | 10/1999 | Martensson | B01D 33/60 | 210/402 |
| 6,063,294 A * | 5/2000 | Martensson | B01D 33/804 | 210/741 |
| 6,217,782 B1 * | 4/2001 | Tuori | B01D 29/6438 | 210/785 |
| 6,258,282 B1 * | 7/2001 | Strid | D21F 1/66 | 210/791 |
| 6,283,306 B1 * | 9/2001 | Nilsson | B01D 33/21 | 210/334 |
| 6,284,136 B1 * | 9/2001 | Tuori | B01D 33/54 | 210/785 |
| 6,294,098 B1 * | 9/2001 | Bergmann | B01D 33/503 | 210/791 |
| 6,354,442 B1 * | 3/2002 | Obst | B01D 29/945 | 210/393 |
| 6,390,106 B1 * | 5/2002 | Lin | B08B 3/022 | 134/180 |
| 6,461,507 B1 * | 10/2002 | Ishigaki | B01D 29/055 | 210/111 |
| 6,500,331 B2 * | 12/2002 | Massignani | B01D 33/39 | 210/330 |
| 6,596,166 B1 * | 7/2003 | Danielsson | B01D 33/50 | 210/324 |
| 6,634,372 B2 * | 10/2003 | Bergmann | B01D 33/463 | 134/152 |
| 6,833,077 B2 * | 12/2004 | Flanagan | B01D 33/466 | 210/392 |
| 7,686,964 B2 * | 3/2010 | Lownertz | D21C 11/0064 | 210/791 |
| 7,736,526 B2 * | 6/2010 | Smith | B01D 33/15 | 210/780 |
| 7,922,829 B2 * | 4/2011 | Livingston | B01D 63/082 | 134/25.1 |
| 8,101,090 B2 * | 1/2012 | Ralvert | B01D 33/21 | 210/138 |
| D655,779 S * | 3/2012 | Honda | D23/209 | |
| D655,780 S * | 3/2012 | Honda | D23/209 | |
| 8,206,582 B2 * | 6/2012 | Jiang | B01D 25/172 | 210/231 |
| 8,287,741 B2 * | 10/2012 | Duby | B01D 25/285 | 210/231 |
| 8,297,447 B2 * | 10/2012 | Sorenson | B01D 29/6453 | 210/411 |
| 8,444,862 B2 * | 5/2013 | Ralvert | B01D 33/50 | 210/138 |
| 8,512,560 B2 * | 8/2013 | Paschedag | B01D 25/19 | 210/231 |
| 8,623,211 B2 * | 1/2014 | Yamane | B01D 29/39 | 210/231 |
| 8,679,335 B1 * | 3/2014 | Dufort | B01D 29/6438 | 210/791 |
| 9,981,210 B2 * | 5/2018 | Duby | B01D 25/285 | |
| 10,143,946 B2 * | 12/2018 | Starcevic | B01D 33/50 | |
| 11,000,791 B2 * | 5/2021 | Jibert | B01D 33/463 | |
| 11,229,863 B2 * | 1/2022 | Duby | B01D 25/164 | |

(56) References Cited

U.S. PATENT DOCUMENTS

| | | | |
|---|---|---|---|
| 11,291,935 B2* | 4/2022 | Jibert | B05B 1/202 |
| 2001/0017279 A1* | 8/2001 | Massignani | B01D 33/39 |
| | | | 210/327 |
| 2002/0050283 A1* | 5/2002 | Bergmann | B08B 3/02 |
| | | | 134/33 |
| 2002/0166821 A1* | 11/2002 | Flanagan | B01D 33/60 |
| | | | 210/402 |
| 2002/0166822 A1* | 11/2002 | Flanagan | B01D 35/12 |
| | | | 210/334 |
| 2004/0045913 A1* | 3/2004 | Flanagan | B01D 33/76 |
| | | | 210/791 |
| 2005/0103727 A1* | 5/2005 | Flanagan | B01D 33/804 |
| | | | 210/772 |
| 2005/0199559 A1* | 9/2005 | Duby | B01D 25/215 |
| | | | 210/791 |
| 2007/0221345 A1* | 9/2007 | Lownertz | D21C 11/0064 |
| | | | 162/14 |
| 2007/0251891 A1* | 11/2007 | Lownertz | D21C 11/0064 |
| | | | 210/791 |
| 2009/0211990 A1* | 8/2009 | Duby | B01D 25/285 |
| | | | 210/791 |
| 2010/0032383 A1* | 2/2010 | Gaiser | B01D 25/176 |
| | | | 210/232 |
| 2010/0032388 A1* | 2/2010 | Ralvert | B01D 33/50 |
| | | | 210/797 |
| 2010/0108620 A1* | 5/2010 | Sorenson | B01D 29/684 |
| | | | 210/791 |
| 2011/0297625 A1* | 12/2011 | Duby | B01D 25/346 |
| | | | 210/791 |
| 2012/0111805 A1* | 5/2012 | Ralvert | B01D 33/21 |
| | | | 210/797 |
| 2013/0043175 A1* | 2/2013 | Hara | B01D 25/176 |
| | | | 24/453 |
| 2013/0126447 A1* | 5/2013 | Duby | B01D 25/346 |
| | | | 210/768 |
| 2014/0319082 A1* | 10/2014 | Zhou | B01D 25/12 |
| | | | 210/231 |
| 2015/0336032 A1* | 11/2015 | Duby | B01D 25/346 |
| | | | 210/791 |
| 2019/0099699 A1* | 4/2019 | Duby | B01D 25/285 |
| 2019/0314742 A1* | 10/2019 | Duby | B01D 25/164 |
| 2021/0252432 A1* | 8/2021 | Duby | B01D 25/386 |
| 2021/0387114 A1* | 12/2021 | Yamamoto | B08B 7/02 |
| 2022/0105449 A1* | 4/2022 | Duby | B01D 25/164 |

FOREIGN PATENT DOCUMENTS

| | | |
|---|---|---|
| JP | 03-098604 A | 4/1991 |
| JP | 05-002704 U | 1/1993 |
| JP | 10-099607 A | 4/1998 |
| JP | 3114508 B2 | 9/2000 |
| JP | 2010214346 A | 9/2010 |
| JP | 2018-069105 A | 5/2018 |

* cited by examiner

FILTER CLOTH CLEANING METHOD OF FILTER PRESS

TECHNICAL FIELD

The present invention relates to a filter cloth cleaning method of a filter press which is used for treatment of drinking water sludge and industrial water sludge and a production process in the chemical industry, the pulp and paper industry, and the like.

BACKGROUND ART

Patent Literature 1 describes a filter cloth cleaning mechanism of a filter press which includes: vibration shafts of a filter cloth arranged at both sides of the filter press and provided with supply paths for cleaning liquid; and cleaning nozzles which jet the cleaning liquid from the vibration shafts toward the filter cloth.

CITATION LIST

Patent Literature

Patent Literature 1: JP 2018-69105 A

SUMMARY OF INVENTION

In the filter cloth cleaning mechanism of Patent Literature 1, supply pipes of the cleaning liquid are integrated with the vibration shafts of the filter cloth and thus the number of components can be decreased. However, the cleaning nozzles are arranged at only positions upper right and left of the filter cloth.

Cleaning of the filter cloth is performed by jetting the cleaning liquid from the both sides toward the center of the filter cloth. In the cleaning, the cleaning liquid jetted from the right and left collides with each other at the center of the filter cloth and then the collided cleaning liquid flows downward on the filter cloth. Thus, the cleaning liquid does not reach portions of the filter cloth in the diagonal directions, which results in uneven cleaning in the filter cloth.

An object of the present invention is to provide a filter cloth cleaning method of a filter press which can avoid uneven cleaning.

A filter cloth cleaning method of a filter press in accordance with some embodiments of the present invention is a method of cleaning a filter cloth of a filter press including a first cleaning nozzle and a second cleaning nozzle which jet cleaning liquid from positions upper right and left of the filter cloth toward respective diagonal corners of the filter cloth, the method including: jetting the cleaning liquid from only the first cleaning nozzle; and jetting the cleaning liquid from only the second cleaning nozzle.

According to the above configuration, it is possible to efficiently clean the whole surface of the filter cloth of the filter press and thus avoid uneven cleaning. Moreover, the whole surface of the filter cloth can be evenly cleaned and thus it is possible to reduce the amount of cleaning water and the cleaning time, for example.

The method may further include jetting the cleaning liquid simultaneously from both the first cleaning nozzle and the second cleaning nozzle.

According to the above configuration, it is possible to concentratedly and intensively clean the center of the filter cloth by the simultaneous cleaning from the right and left.

A liquid supply plate for supplying an original solution may be fixed to an upper center of the filter cloth.

According to the above configuration, it is possible to easily clean the liquid supply plate and prevent or resolve clogging of an original solution path. It is also possible to efficiently clean the filter cloth partially and thus the amount of cleaning water and the cleaning time can be reduced.

A pair of guide rails may be provided on both sides of the filter plate on which the filter cloth is stretched and the filter plate may be supported by the pair of guide rails via filter plate arms provided on both shoulders of the filter plate.

According to the above configuration, the first cleaning nozzle and the second cleaning nozzle are arranged to be directed to respective diagonal corners of the filter cloth and the guide rails are arranged at both sides of the filter plate. Thus, it is possible to prevent scatter of the cleaning liquid to the outside of the apparatus.

The first cleaning nozzle and the second cleaning nozzle may be provided on vibration shafts which hang the filter cloth and supply paths for the cleaning liquid may be formed in the vibration shafts.

According to the above configuration, it is possible to decrease the number of components.

DESCRIPTION OF EMBODIMENTS

Figure 1:
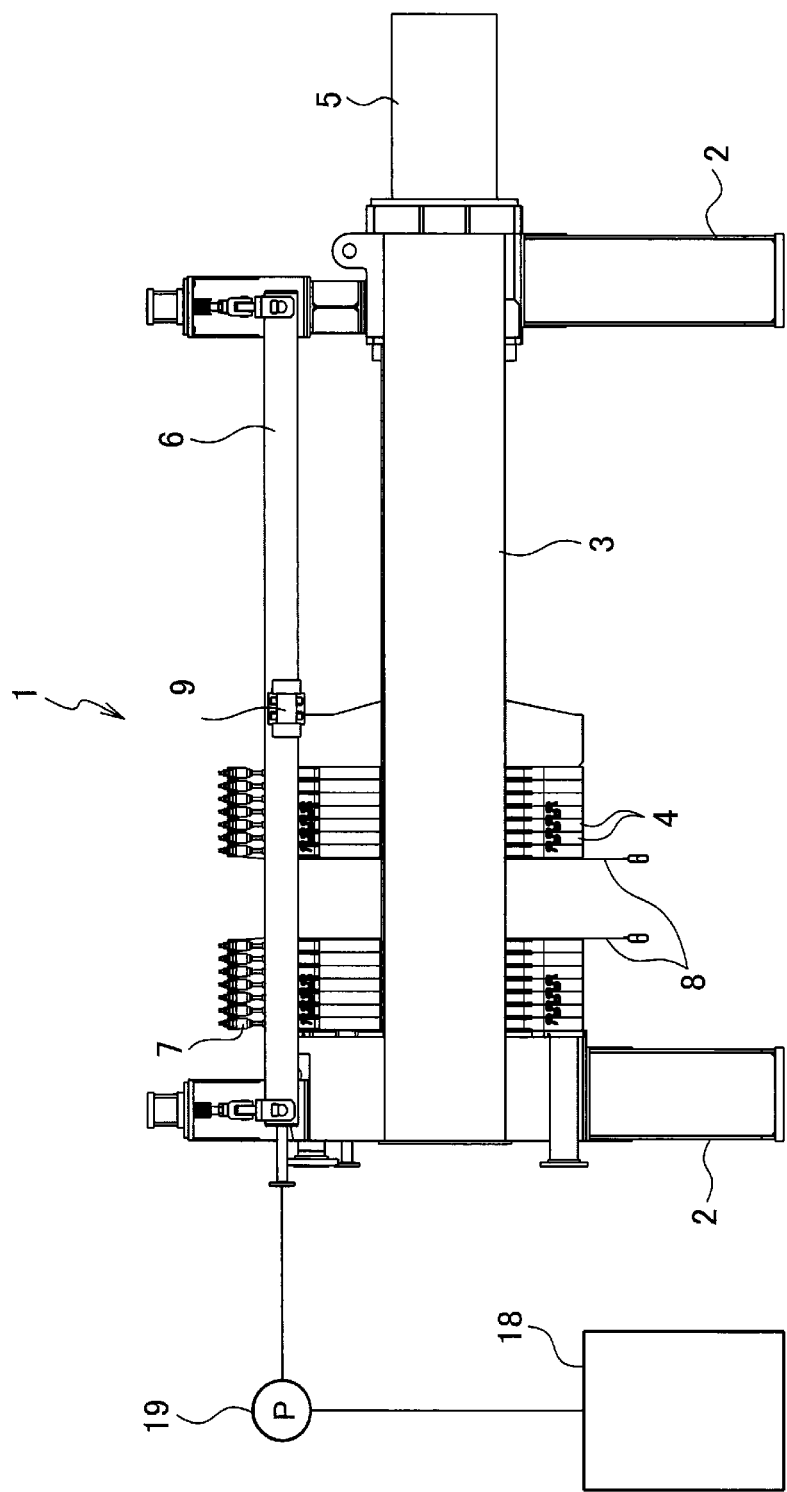
FIG. 1 is a side view of a filter press using a filter cloth cleaning apparatus according to an embodiment of the present invention.

Description will be hereinbelow provided for embodiments of the present invention by referring to the drawings. It should be noted that the same or similar parts and components throughout the following description of the drawings will be denoted by the same or similar reference signs. However, it should be noted that the drawings are schematic and therefore ratios of dimensions are different from the actual ones.

Accordingly, specific dimensions and the like should be determined in consideration of the following description. Moreover, it is a matter of course that portions having different dimensional relationships and ratios are included between the drawings.

Figure 2:
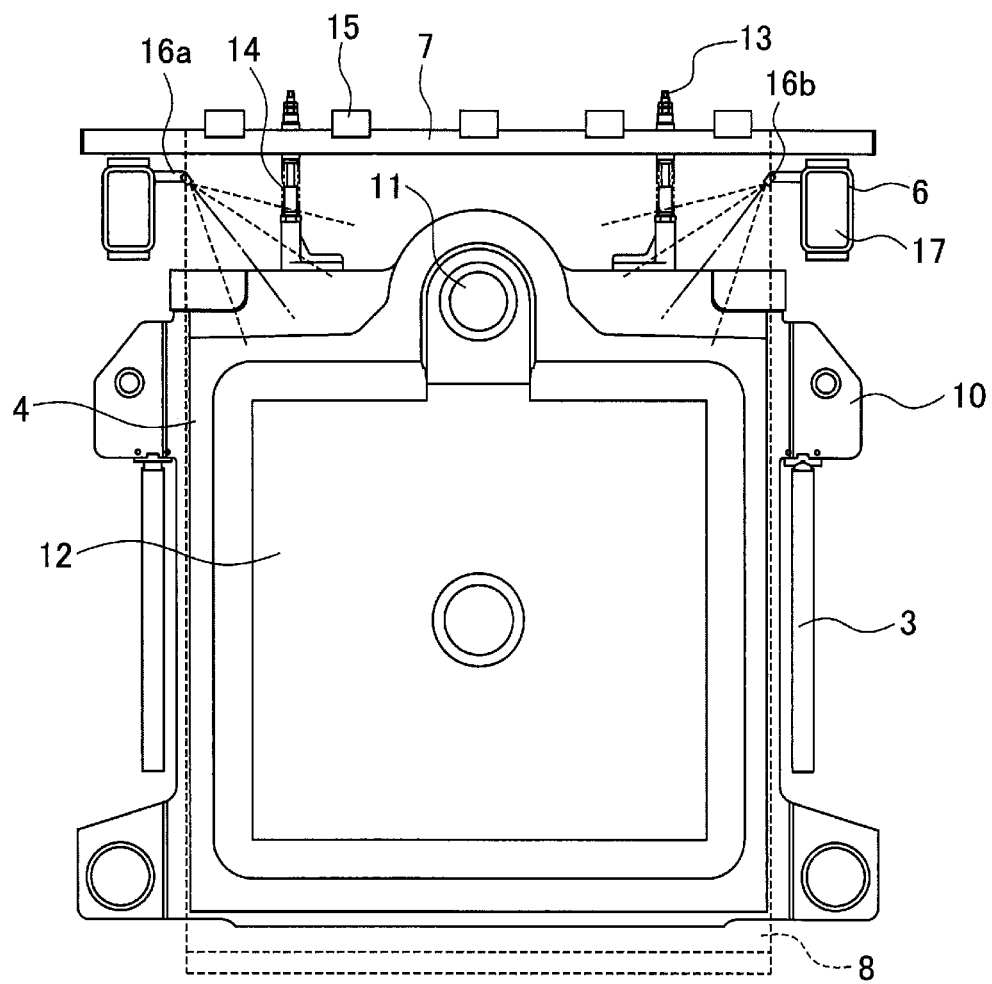
FIG. 2 is a front view of the main portion of the filter cloth cleaning apparatus according to the embodiment of the present invention.
Figure 3:
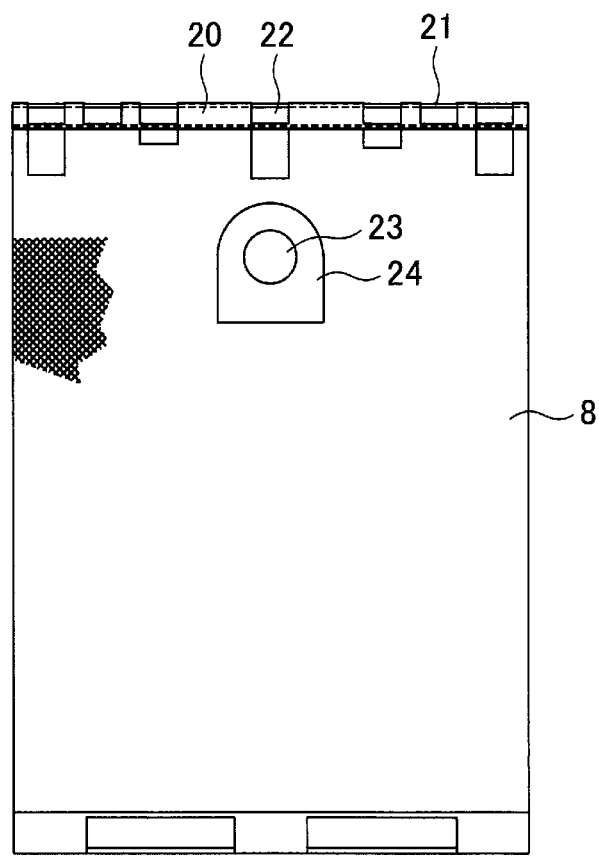
FIG. 3 is a front view of a filter cloth according to the embodiment of the present invention.
Figure 4:
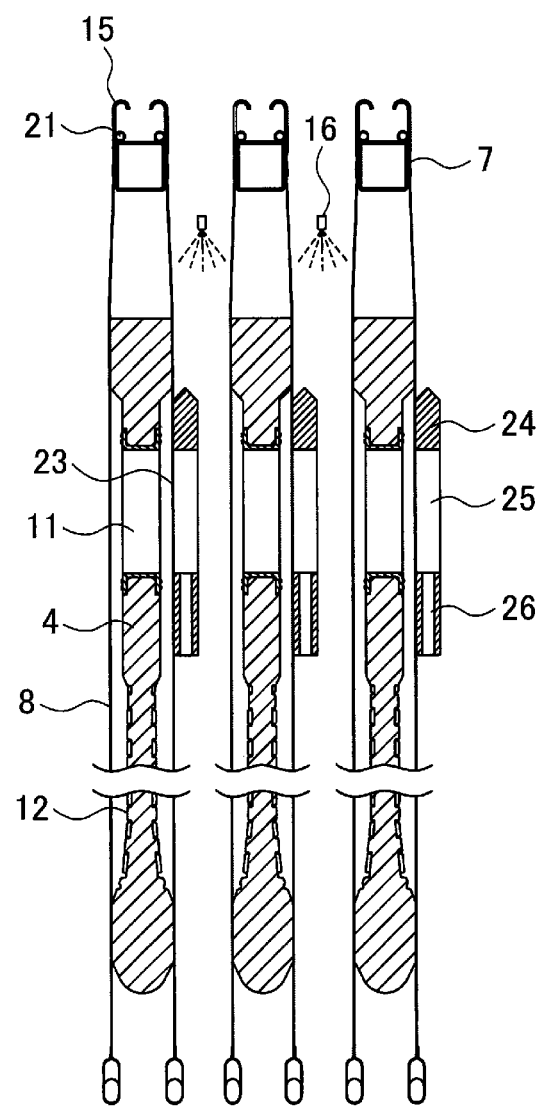
FIG. 4 is a cross-sectional view of the main portions of filter plates with the filter cloths being hung according to the embodiment of the present invention.
Figure 5:
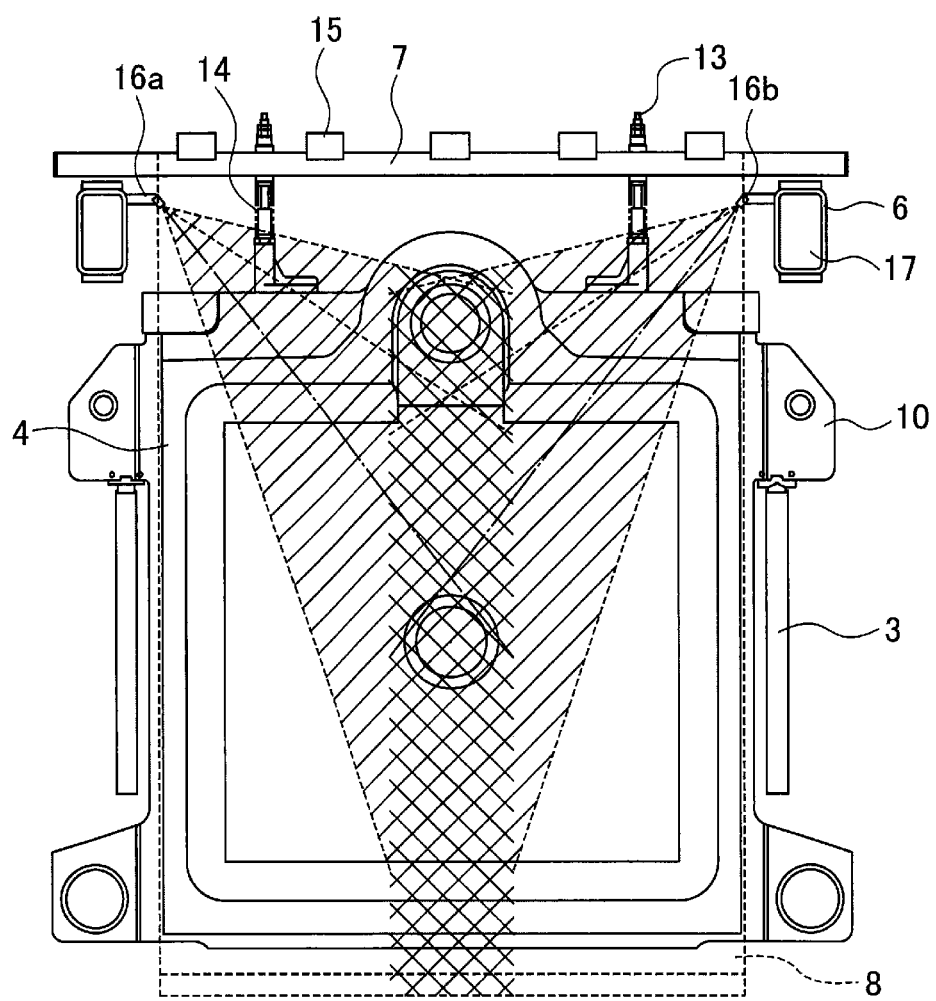
FIG. 5 is a front view of the filter cloth during a simultaneous jet cleaning according to the embodiment of the present invention.
Figure 6:
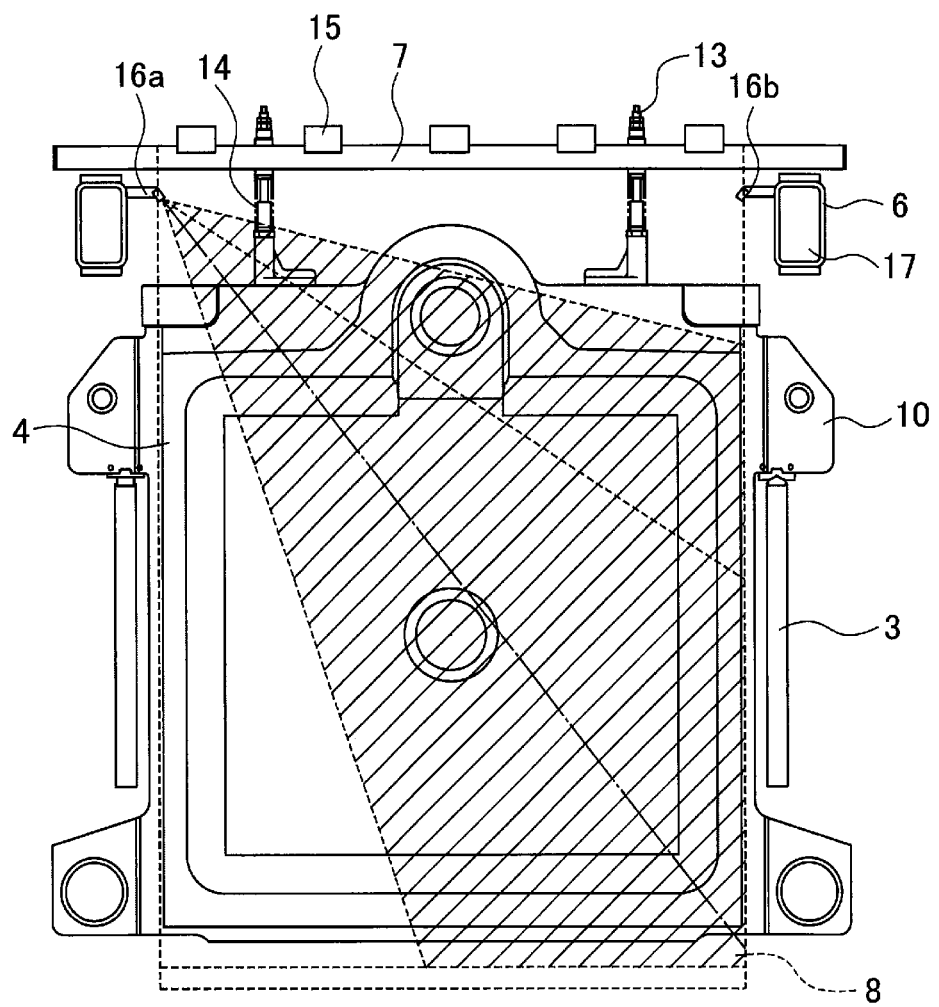
FIG. 6 is a front view of the filter cloth during a one-side jet cleaning according to the embodiment of the present invention.
Figure 7:
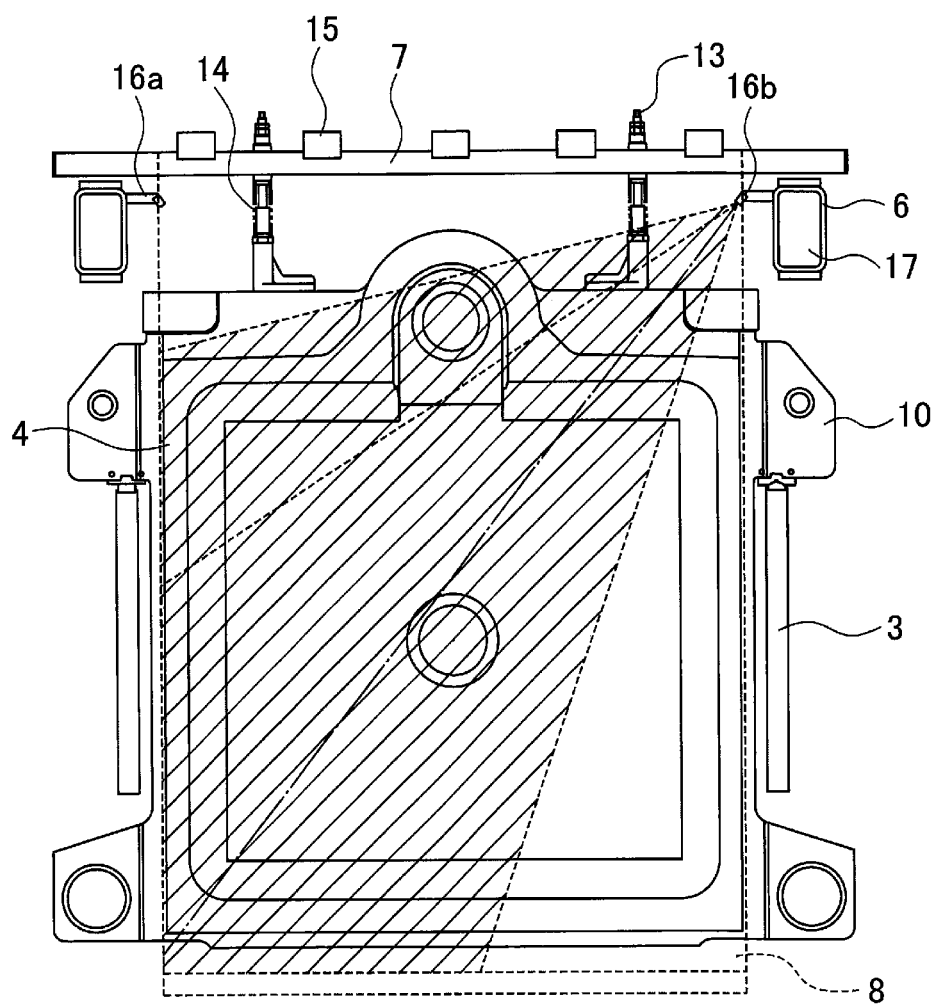
FIG. 7 is a front view of the filter cloth during an other-side jet cleaning according to the embodiment of the present invention.

FIG. 1 is a side view of a filter press 1 using a filter cloth cleaning apparatus according to an embodiment of the present invention. FIG. 2 is a front view of the main portion of the filter cloth cleaning apparatus according to the embodiment of the present invention. FIG. 3 is a front view of a filter cloth 8 according to the embodiment of the present invention. FIG. 4 is a cross-sectional view of the main portions of filter plates 4 with the filter cloths 8 being hung according to the embodiment of the present invention. FIG. 5 is a front view of the filter cloth 8 during a simultaneous jet cleaning according to the embodiment of the present invention. FIG. 6 is a front view of the filter cloth 8 during a one-side jet cleaning according to the embodiment of the present invention. FIG. 7 is a front view of the filter cloth 8 during an other-side jet cleaning according to the embodiment of the present invention.

As illustrated in FIGS. 1 and 2, the filter press 1 includes frames 2 arranged at the right and left, a pair of guide rails 3 supported between the frames 2, filter plates 4 movably arranged in parallel on the guide rails 3, and an opening/closing device 5 which opens and closes the filter plates 4.

A pair of vibration shafts 6 are provided above the filter plates 4 along the guide rails 3. At least one of the pair of vibration shafts 6 is provided with a vibration device such as a vibrator 9 and an air spring. A support bar 7 bridged between the vibration shafts 6 and swingable up and down is arranged above each filter plate 4. By hanging the filter cloths 8 on the support bars 7, the filter cloths 8 are arranged between the filter plates 4. When the pair of vibration shafts 6 are vibrated by the vibrator 9, the support bars 7 bridged between the vibration shafts 6 are also vibrated and the filter cloths 8 hung on the support bars 7 are similarly vibrated.

Both shoulders of each filter plate 4 are provided with filter plate arms 10 which are supported between the guide rails 3 and arrange the filter plates 4 in parallel on the guide rails 3. An upper center of each filter plate 4 is formed with an original solution supply path 11.

As illustrated in FIGS. 2 and 4, center portions of each filter plate 4 are formed with concave filter beds 12 over which the filter cloths 8 are stretched. A filter chamber is formed between the parallel-arranged filter plates 4 by the filter beds 12 and an original solution is supplied and dewatered between the filter cloths 8 arranged in the filter chamber.

Both shoulders of each filter plate 4 are provided with upright guide shafts 13 which support the support bar 7. Springs 14 are inserted around the guide shafts 13 respectively and the support bar 7 is supported by the springs 14 so as to be elastically swingable. Both side surfaces of each support bar 7 are provided with latches 15 for hanging the filter cloths 8.

Since support bars 7 are bridged between the vibration shafts 6, the filter cloths 8 hung on the support bars 7 are vibrated by operating the vibrator 9 provided on the vibration shaft 6 to separate dewatered cake adhered to the filter cloths 8 from the filter cloths 8.

When the vibration shafts 6 are vibrated up and down by vibration of the vibrator 9 and the dewatered cake is separated, the support bar 7 bridged between the vibration shafts 6 is jumped up by the springs 14 inserted around the guide shafts 13.

Cleaning nozzles 16a and 16b are arranged on upper sides of the vibration shafts 6 respectively. The cleaning nozzles 16a and 16b are arranged to be directed to the filter cloths 8 to clean the filter cloths 8 stretched on the filter plates 4.

The cleaning nozzles 16a and 16b are arranged with their central axes directed in diagonal directions of each filter cloth 8 respectively and this arrangement enables cleaning of the whole surface of the filter cloths 8 with a sufficient cleaning pressure. Moreover, since the cleaning nozzles 16a and 16b jet the cleaning liquid toward the filter cloths 8 in the respective diagonal directions of the filter cloths 8, scattering of the cleaning liquid is prevented by the guide rails 3 arranged on both sides of each filter plate 4.

The inside of each vibration shaft 6 is hollow and forms a supply path 17 of the cleaning liquid. The cleaning liquid supplied from the supply paths 17 is jetted from the cleaning nozzles 16a and 16b provided on the vibration shafts 6.

The cleaning nozzles 16a and 16b are arranged between the opened filter plates 4 at every space between the adjacent filter plates 4 so that all the filter cloths 8 can be cleaned simultaneously.

In the present embodiment, the vibration shafts 6 are provided with the cleaning nozzles 16a and 16b and the supply paths 17. However, the present invention is not limited to the above configuration as long as the cleaning nozzles 16a and 16b are provided above both sides of each filter cloth 8 and the cleaning liquid can be supplied to the cleaning nozzles 16a and 16b.

Note that in the case where the vibration shafts 6 are provided with the supply paths 17, one end of each vibration shaft 6 is connected to the cleaning water storage tank 18 as illustrated in FIG. 1 and cleaning water is supplied to each vibration shaft 6 by a cleaning water supply pump 19.

As illustrated in FIG. 3, an upper edge of each filter cloth 8 which is rectangular is formed with a bag portion 20. A filter cloth support bar 21 is inserted in the bag portion 20 and the inserted filter cloth support bar 21 is locked to the latches 15 of the support bar 7. The bag portion 20 includes cutout holes 22 which open at positions where the filter cloth support bar 21 is locked with the latches 15. An upper center of each filter cloth 8 is provided with a through hole 23 which is in contact with the original solution supply path 11 of the filter plate 4 and supplies the original solution.

As illustrated in FIG. 4, the filter cloth support bar 21 inserted into the bag portion 20 at an upper portion of the filter cloth 8 illustrated in FIG. 3 is exposed from the cutout holes 22 and then the filter cloth support bar 21 exposed from the cutout holes 22 is locked to the latches 15 of the support bar 7 provided at an upper portion of the filter plate 4 illustrated in FIG. 2, and thereby hanging the filter cloth 8. The filter cloths 8 are hung in front of the filter beds 12 provided on the front and rear of each filter plate 4.

As illustrated in FIG. 4, a liquid supply plate 24 is tied up (fixed) to one of a pair of the filter cloths 8 hung between the filter plates 4. The original solution supply path 11 formed in the filter plate 4 and the through hole 23 in the upper center of the filter cloth 8 are joined to an original solution path 25 of the liquid supply plate 24, and a liquid supply path 26 which is branched from the original solution path 25 of the liquid supply plate 24 and supplies the original solution to a filter surface of the filter cloth 8 is provided.

The filter press 1 first operates the opening/closing device 5 of the filter plates 4 and moves the filter plates 4 arranged in parallel along the guide rails 3 to one side to close the filter plates 4. The filter cloths 8 are stretched over the filter beds 12 of opposing sides of the closed filter plates 4 and the filter chamber is formed between the filter cloths 8 stretched in between the filter plates 4. The original solution is supplied to the filter chamber through the original solution supply path 11 and the original solution is dewatered. Filtrate passing through the filter cloth 8 is discharged to the outside through an illustrated discharge port provided in the filter bed 12.

After completion of dewatering, the filter plates 4 are opened by the opening/closing device 5 and the dewatered cake is discharged. The vibrator 9 provided on the vibration shaft 6 is activated and the support bars 7 bridged between the vibration shafts 6 are swung. When the dewatered cake adhered to the filter cloths 8 is separated from the filter cloths 8, the filter cloths 8 hung on the support bars 7 are jumped up together with the support bars 7.

After the dewatered cake is separated, the cleaning water is jetted from the cleaning nozzles 16 provided on the vibration shafts 6. The cleaning water is jetted from the cleaning nozzles 16 toward the filter cloths 8 to clean the filter cloths 8.

After cleaning of the filter cloths 8 is completed, the filter plates 4 are closed again to perform dewatering.

Hereinafter, a filter cloth cleaning method of a filter press according to an embodiment will be described in detail.

The filter press 1 jets the cleaning liquid from the cleaning nozzles 16 provided on the pair of vibration shafts 6 to clean the filter cloths 8. Accordingly, the filter cloths 8 are cleaned by jetting the cleaning liquid from the pair of cleaning nozzles 16a and 16b arranged at positions upper right and left of the filter cloths 8.

The pair of cleaning nozzles 16a and 16b respectively operate jetting of the cleaning water and the filter cloths 8 are cleaned by performing: a simultaneous jet cleaning step of jetting the cleaning liquid from both the pair of cleaning nozzles 16a and 16b; a one-side jet cleaning step of jetting the cleaning liquid from only the cleaning nozzle 16a which is one of the cleaning nozzles 16a and 16b; and an other-side jet cleaning step of jetting the cleaning liquid from only the cleaning nozzle 16b which is the other of the cleaning nozzles 16a and 16b. By performing these steps, the portion of the filter cloth 8 in the vicinity of the liquid supply plate 24 can be concentratedly cleaned and the whole surface of the filter cloth 8 also can be cleaned.

Note that jetting of the pair of cleaning nozzles 16a and 16b can be switched by a known technique such as ON/OFF of the cleaning water supply pump 19 and switching of opening/closing of valves.

The simultaneous jet cleaning step will be described with reference to FIG. 5.

Since the liquid supply plate 24 is provided at the upper center of the filter cloth 8, dirt is concentrated in the portion of the filter cloth 8 in the vicinity of the liquid supply plate 24. Therefore, the simultaneous jet cleaning step is performed first.

In the simultaneous jet cleaning step, the cleaning liquid is simultaneously jetted from the pair of cleaning nozzles 16a and 16b. In this case, since the cleaning water is simultaneously jetted from the right and left cleaning nozzles 16a and 16b, the cleaning water collides with each other in the center of the filter cloth 8. The collided water flows downward.

At this time, since the pair of cleaning nozzles 16a and 16b are arranged to be directed to the respective diagonal corners from positions upper right and left of the filter cloth 8, the cleaning water does not reach lower right and left portions of the filter cloth 8.

The liquid supply plate 24 is arranged at the upper center of the filter cloth 8 and the liquid supply plate 24 is cleaned intensively with the force of collision of the cleaning water.

After a prescribed time has elapsed, the simultaneous jet cleaning step is completed.

Next, the one-side jet cleaning step will be described with reference to FIG. 6.

After the simultaneous jet cleaning step is completed, the step shifts to the one-side jet cleaning step.

In the one-side jet cleaning step, the cleaning water is jetted from the cleaning nozzle 16a which is one of the pair of cleaning nozzles 16a and 16b. Since the cleaning nozzle 16a is arranged to be directed to the diagonal corner of the filter cloth 8, the cleaning liquid is jetted to the diagonal lower portion of the filter cloth 8. In the simultaneous jet cleaning step, the cleaning liquid does not reach the diagonal corner of the filter cloth 8 due to collision of the cleaning liquid from the right and left. In contrast, in the one-side jet cleaning step, since the cleaning liquid is jetted from only one cleaning nozzle 16a, the cleaning liquid reaches the diagonal corner of the filter cloth 8 and thus an uncleaned portion of the filter cloth 8 (the lower right of the filter cloth 8 in FIG. 6) can be cleaned up.

After a prescribed time has elapsed, the one-side jet cleaning step is completed.

Next, the other-side jet cleaning step will be described with reference to FIG. 7.

After the one-side jet cleaning step is completed, the step shifts to the other-side jet cleaning step.

In the other-side jet cleaning step, the cleaning water is jetted from the cleaning nozzle 16b which is the other of the pair of cleaning nozzles 16a and 16b. Since the cleaning nozzle 16b is arranged to be directed to the diagonal corner of the filter cloth 8, the cleaning liquid is jetted to the diagonal lower portion of the filter cloth 8. In the simultaneous jet cleaning step and the one-side jet cleaning step, the cleaning liquid does not reach the diagonal corner of the other cleaning nozzle 16b. In contrast, in the other-side jet cleaning step, since the cleaning liquid is jetted from only the other cleaning nozzle 16b, the cleaning liquid reaches the diagonal corner of the filter cloth 8 and thus an uncleaned portion of the filter cloth 8 (the lower left of the filter cloth 8 in FIG. 7) can be cleaned up.

After a prescribed time has elapsed, the other-side jet cleaning step is completed.

The simultaneous jet cleaning step, the one-side jet cleaning step, and the other-side jet cleaning step can be performed in any order and the portion of the filter cloth in the vicinity of the liquid supply plate 24 can be concentratedly cleaned and the whole area of the filter cloth 8 can be cleaned.

Note that the simultaneous jet cleaning step may be omitted depending on the state of dirt of the filter cloth (the portion in the vicinity of the liquid supply plate 24, for example). In the state, the whole surface of the filter cloth 8 can be cleaned by the one-side jet cleaning step and the other-side jet cleaning step.

The filter cloth cleaning method of the filter press according to the embodiment is applicable to a filter press in which a pair of cleaning nozzles are provided above a filter cloth and the cleaning nozzles are directed in the respective diagonal directions of the filter cloth. Since the whole surface of the filter cloth is efficiently cleaned, the amount of cleaning water and the cleaning time can be reduced. The filter press can be used not only for drinking water sludge and industrial water sludge, but also for a production process in a chemical plant and the like.

In this way, the present invention includes various embodiments not described above. Therefore, the scope of the present invention is determined only by the invention identification matters according to claims reasonable from the foregoing description.

The entire contents of Japanese Patent Application No. 2018-207875 (filing date: Nov. 5, 2018) are incorporated herein by reference.

The invention claimed is:

1. A method of cleaning a filter cloth of a filter press comprising a first fixed-direction cleaning nozzle arranged to be fixedly-directed to a first respective diagonal corner of the filter cloth and a second fixed-direction cleaning nozzle arranged to be fixedly-directed to a second respective diagonal corner of the filter cloth, which first fixed-direction cleaning nozzle and second fixed-direction cleaning nozzle jet cleaning liquid from positions upper right and left of the filter cloth toward the respective diagonal corners of the filter cloth, the method comprising:

during a first time period, jetting the cleaning liquid from only the first fixed-direction cleaning nozzle to the filter cloth; and during a second time period, jetting the cleaning liquid from only the second fixed-direction cleaning nozzle to the filter cloth.

2. The method of cleaning the filter cloth of the filter press according to claim 1, further comprising during a third time period, jetting the cleaning liquid simultaneously from both the first fixed-direction cleaning nozzle and the second fixed-direction cleaning nozzle to the filter cloth.

3. The method of cleaning the filter cloth of the filter press according to claim 2, wherein during the third time period, a collision of the cleaning liquid from the first fixed-direction cleaning nozzle and the cleaning liquid from the second fixed-direction cleaning nozzle is maintained.

4. The method of cleaning the filter cloth of the filter press according to claim 3, wherein during the first time period and the second time period the collision is absent so that the cleaning liquid reaches the respective diagonal corners of the filter cloth.

5. The method of cleaning the filter cloth of the filter press according to claim 1, wherein a liquid supply plate for supplying an original solution is fixed to an upper center of the filter cloth.

6. The method of cleaning the filter cloth of the filter press according to claim 1, wherein a pair of guide rails are provided on both sides of a filter plate on which the filter cloth is stretched, and the filter plate is supported by the pair of guide rails via filter plate arms provided on both shoulders of the filter plate.

7. The method of cleaning the filter cloth of the filter press according to claim 1, wherein the first fixed-direction cleaning nozzle and the second fixed-direction cleaning nozzle are provided on vibration shafts which hang the filter cloth, and supply paths for the cleaning liquid are formed in the vibration shafts.

8. The method of cleaning the filter cloth of the filter press according to claim 1, wherein the first fixed-direction cleaning nozzle is configured to jet the cleaning liquid from a position upper left of the filter cloth toward a diagonal corner lower right of the filter cloth within a first jetting area which includes a lower right of the filter cloth and does not include a portion of a lower left of the filter cloth, the second fixed-direction cleaning nozzle is configured to jet the cleaning liquid from a position upper right of the filter cloth toward a diagonal corner lower left of the filter cloth within a second jetting area which includes the lower left of the filter cloth and does not include a portion of the lower right of the filter cloth, and the first jetting area and the second jetting area cover a whole area of the filter cloth.

* * * * *